(12) United States Patent
Li et al.

(10) Patent No.: US 11,784,317 B2
(45) Date of Patent: Oct. 10, 2023

(54) SOLID OXIDE FUEL CELL AND MANUFACTURING METHOD OF THE SAME

(71) Applicant: TAIYO YUDEN CO., LTD., Tokyo (JP)

(72) Inventors: Xinyu Li, Tokyo (JP); Chie Kawamura, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/999,034

(22) Filed: Aug. 20, 2020

(65) Prior Publication Data

US 2021/0066725 A1 Mar. 4, 2021

(30) Foreign Application Priority Data

Aug. 30, 2019 (JP) .................................. 2019-157789

(51) Int. Cl.
*H01M 4/86* (2006.01)
*H01M 8/1246* (2016.01)
(Continued)

(52) U.S. Cl.
CPC ......... *H01M 4/8673* (2013.01); *H01M 4/861* (2013.01); *H01M 4/8621* (2013.01); *H01M 4/8652* (2013.01); *H01M 4/8657* (2013.01); *H01M 4/8846* (2013.01); *H01M 4/8885* (2013.01); *H01M 4/8889* (2013.01); *H01M 4/9033* (2013.01); *H01M 8/1246* (2013.01);
(Continued)

(58) Field of Classification Search
CPC ......... H01M 4/861; H01M 2008/1293; H01M 8/12–8/1286
See application file for complete search history.

(56) References Cited

U.S. PATENT DOCUMENTS

2005/0266297 A1 12/2005 Irvine et al.
2008/0090127 A1* 4/2008 Gorte .................. H01M 4/9016
429/535
(Continued)

FOREIGN PATENT DOCUMENTS

CN 1897337 A 1/2007
JP H 07-249412 A 9/1995
(Continued)

OTHER PUBLICATIONS

Gupta, Sapna, Manoj K. Mahapatra, and Prabhakar Singh. "Lanthanum chromite based perovskites for oxygen transport membrane." Materials Science and Engineering: R: Reports 90 (2015): 1-36 (Year: 2015).
(Continued)

*Primary Examiner* — Jonathan Crepeau
(74) *Attorney, Agent, or Firm* — Stein IP, LLC

(57) ABSTRACT

A solid oxide fuel cell includes: a support layer mainly composed of a metal; an anode supported by the support; and a mixed layer interposed between the support and the anode, wherein the anode includes an electrode bone structure composed of a ceramic material containing a first oxide having electron conductivity and a second oxide having oxygen ion conductivity, and the mixed layer has a structure in which a metallic material and a ceramic material are mixed.

12 Claims, 5 Drawing Sheets

(51) Int. Cl.
  *H01M 4/90* (2006.01)
  *H01M 8/12* (2016.01)
  *H01M 4/88* (2006.01)

(52) U.S. Cl.
  CPC .......... *H01M 2004/8684* (2013.01); *H01M 2008/1293* (2013.01); *H01M 2300/0074* (2013.01)

(56) References Cited

U.S. PATENT DOCUMENTS

| | | | | |
|---|---|---|---|---|
| 2009/0061279 A1* | 3/2009 | Larsen | ............... | H01M 8/1226 429/410 |
| 2010/0028757 A1 | 2/2010 | Fu et al. | ............... | 429/40 |
| 2010/0178589 A1* | 7/2010 | Kwon | ............... | H01M 8/2432 429/535 |
| 2012/0003565 A1* | 1/2012 | Son | ............... | H01M 4/861 429/496 |
| 2013/0224628 A1 | 8/2013 | Moon | ............... | 429/479 |
| 2019/0296385 A1 | 9/2019 | Sugihara | | |
| 2022/0200033 A1 | 6/2022 | Seno et al. | | |

FOREIGN PATENT DOCUMENTS

| | | |
|---|---|---|
| JP | H 09-027330 A | 1/1997 |
| JP | 2005-535084 A | 11/2005 |
| JP | 2009-541955 A | 11/2009 |
| JP | 2012-033418 A | 2/2012 |
| JP | 2016-115506 A | 6/2016 |
| JP | 2018-055946 A | 4/2018 |
| JP | WO 2019/159276 A1 | 8/2019 |
| WO | WO 2020/218431 A1 | 10/2020 |

OTHER PUBLICATIONS

Gao, Zhan, et al. "A perspective on low-temperature solid oxide fuel cells." Energy & Environmental Science 9.5 (2016): 1602-1644 (Year: 2016).

Fan, W., et al. "Improved properties of scandia and yttria co-doped zirconia as a potential thermal barrier material for high temperature applications." Journal of the European Ceramic Society 38.13 (2018): 4502-4511 (Year: 2018).

WO2019159276A1, Shibata, et al., "Metal Supported Cell", machine English translation retrieved from https://worldwide.espacenet.com/ on Dec. 8, 2022 (Year: 2019).

Final Office Action dated Dec. 19, 2022, issued to U.S. Appl. No. 17/031,666.

Fabbri, Emiliana, et al. "Electrode materials: a challenge for the exploitation of protonic solid oxide fuel cells." Science and technology of advanced materials (2010) (Year: 2010).

Ju, Young-Wan, et al. "New buffer layer material La (Pr) CrO3 for intermediate temperature solid oxide fuel cell using LaGaO3-based electrolyte film." Journal of Materials Research 27 (2012): 1906-1914 (Year: 2012).

Vert, Vicente B., et al. "Redox stability and electrochemical study of nickel doped chromites as anodes for H2/CH4-fueled solid oxide fuel cells." Applied Catalysis B: Environmental 115 (2012): 346-356. (Year: 2012).

Oh, Tae-Sik, et al. "Infiltrated lanthanum strontium chromite anodes for solid oxide fuel cells: Structural and catalytic aspects." Journal of Power Sources 262 (2014): 207-212 (Year: 2014).

Yan, Yan, et al. "Fabrication of reactive element oxide coatings on porous ferritic stainless steel for use in metal-supported solid oxide fuel cells." Surface and Coatings Technology 272 (2015): 415-427 (Year: 2015).

Huang, B., et al. "Characterization of a Cu—La0. 75Sr0. 25Cr0. 5Mn0. 5O3—CeO2/La0. 75Sr0. 25Cr0. 5Mn0. 5O3-YSZ/Ni—ScSZ three-layer structure anode in thin film solid oxide fuel cell running on methane fuel." Fuel Cells 15 (2015): 398-407. (Year: 2015).

Wasilewski, Eric, et al. "Cu/LaCrO3 joining by local melt infiltration through laser cladding." Journal of the American Ceramic Society 101 (2018): 4472-4479. (Year: 2018).

Notice of Reasons for Refusal dated May 9, 2023, in related Japanese Patent Application No. 2019-157789.

Notice of Reasons for Refusal dated Jul. 25, 2023 in related Japanese Patent Application No. 2019-184725.

Office Action dated Aug. 18, 2023, issued to related U.S. Appl. No. 17/031,666.

* cited by examiner

FIG. 4A

| | ELEC-TROLYTE | ANODE BONE STRUCTURE | | COMPOSITE CATALYST | | MIXED LAYER | | |
|---|---|---|---|---|---|---|---|---|
| | | FIRST OXIDE | SECOND OXIDE | CATALYST | THIRD OXIDE | OXIDE | METAL | OXIDE : METAL : VOID |
| EXAMPLE 1 | ScYSZ | LaTiO$_3$-BASED | ScYSZ | Ni | ScYSZ | LaTiO$_3$ | SUS POWDER | 1 : 1 : 1 |
| EXAMPLE 2 | ScYSZ | LaCrO$_3$-BASED | ScYSZ | Ni | ScYSZ | LaCrO$_3$ | SUS POWDER | 1 : 1 : 1 |
| EXAMPLE 3 | ScYSZ | LaCrO$_3$-BASED | ScYSZ | Ni | GDC | LaCrO$_3$ | SUS POWDER | 1 : 1 : 1 |
| EXAMPLE 4 | GDC | LaCrO$_3$-BASED | GDC | Ni | ScYSZ | LaCrO$_3$ | SUS POWDER | 1 : 1 : 1 |
| EXAMPLE 5 | ScYSZ | LaCrO$_3$-BASED | ScYSZ | Ni | — | LaCrO$_3$ | SUS POWDER | 1 : 1 : 1 |
| EXAMPLE 6 | ScYSZ | LaCrO$_3$-BASED | ScYSZ | Ni | GDC | ScYSZ | SUS POWDER | 1 : 1 : 1 |
| EXAMPLE 7 | ScYSZ | LaTiO$_3$-BASED | ScYSZ | Ni | ScYSZ | LaTiO$_3$ | SUS POWDER | 1 : 6 : 3 |
| EXAMPLE 8 | ScYSZ | LaTiO$_3$-BASED | ScYSZ | Ni | ScYSZ | LaTiO$_3$ | SUS POWDER | 6 : 1 : 3 |
| EXAMPLE 9 | ScYSZ | LaTiO$_3$-BASED | ScYSZ | Ni | ScYSZ | LaTiO$_3$ | SUS POWDER | 4.5 : 4.5 : 1 |
| COMPARATIVE EXAMPLE 1 | ScYSZ | LaCrO$_3$-BASED | ScYSZ | Ni | GDC | — | — | — |
| COMPARATIVE EXAMPLE 2 | ScYSZ | Ni | ScYSZ | — | — | — | — | — |

FIG. 4B

| | PEELING | OHMIC RESISTANCE ($\Omega \cdot cm^2$) | ANODE REACTION RESISTANCE ($\Omega \cdot cm^2$) |
|---|---|---|---|
| EXAMPLE 1 | NOT OBSERVED | 0.25 | 0.27 |
| EXAMPLE 2 | NOT OBSERVED | 0.25 | 0.28 |
| EXAMPLE 3 | NOT OBSERVED | 0.24 | 0.27 |
| EXAMPLE 4 | NOT OBSERVED | 0.2 | 0.21 |
| EXAMPLE 5 | NOT OBSERVED | 0.5 | 1.1 |
| EXAMPLE 6 | NOT OBSERVED | 0.31 | 0.28 |
| EXAMPLE 7 | NOT OBSERVED | 0.25 | 0.27 |
| EXAMPLE 8 | NOT OBSERVED | 0.25 | 0.27 |
| EXAMPLE 9 | NOT OBSERVED | 0.25 | 0.82 |
| COMPARATIVE EXAMPLE 1 | OBSERVED | — | — |
| COMPARATIVE EXAMPLE 2 | NOT OBSERVED | 0.63 | 0.97 |

SOLID OXIDE FUEL CELL AND MANUFACTURING METHOD OF THE SAME

CROSS-REFERENCE TO RELATED APPLICATION

This application is based upon and claims the benefit of priority of the prior Japanese Patent Application No. 2019-157789, filed on Aug. 30, 2019, the entire contents of which are incorporated herein by reference.

FIELD

A certain aspect of the present embodiments relates to a solid oxide fuel cell and a manufacturing method of the same.

BACKGROUND

The solid oxide fuel cell includes a solid oxide electrolyte layer having oxygen ion conductivity, an anode, and a cathode. At the anode, oxygen ions passing through the solid oxide electrolyte layer from the cathode react with hydrogen contained in a fuel gas. This reaction generates power.

In a commonly used cermet electrode made of Ni and an ion conductive oxide, when fuel shortage occurs, Ni is locally oxidized to NiO, and a cell may crack because of volume expansion. Thus, the anode in which Ni is not used for the electrode bone structure is being developed.

For example, Japanese Patent Application Publication Nos. 2018-55946, 2012-33418, and 2009-541955 (hereinafter, referred to as Patent Documents 1 to 3) disclose the following fuel electrode (the anode). A first oxide (an electron conductive oxide), which is made of a perovskite-type oxide titanate and has electron conductivity, and a second oxide (an ion conductive oxide), which is made of $CeO_2$ doped with $Gd_2O_3$ or $Sm_2O_3$ and has ionic conductivity, form the electrode bone structure. Additionally, a composite catalyst that carries a metallic catalyst (an electrode catalyst metal) such as Ni and contains a third oxide having ionic conductivity is introduced in the electrode bone structure by impregnation.

SUMMARY

In the above anode, the electrode bone structure is a sintered compact of the ion conductive oxide and the electron conductive oxide. Thus, the volume of the electrode bone structure does not change in a high-temperature reductive atmosphere, and thereby, breakage of the electrode is avoided. Additionally, in the composite catalyst introduced by impregnation, the metallic catalyst is carried on an oxide and fixed. Thus, the aggregation of the metallic catalyst is inhibited.

The material of the entire cell including a support is composed of ceramic. Thus, usually, firing is performed in an air atmosphere. Even when crack of the cell due to the volume expansion caused by oxidation of Ni is prevented by making the metallic catalyst dispersedly carried on the electrode bone structure made of the electron conductive oxide and the ion conductive oxide, it is difficult to solve fundamental problems that the solid oxide fuel cell made of ceramic is unable to withstand a thermal shock and a mechanical shock. On the other hand, a metal-supported cell that can withstand vibration and shock and rapid rising and falling of temperature is fired in a strong reductive atmosphere. When a perovskite-type oxide titanate is fired in a reductive atmosphere, the adhesion between the perovskite-type oxide titanate and the metal support layer is poor, and interlayer peeling may occur.

According to a first aspect of the present embodiments, there is provided a solid oxide fuel cell including: a support layer mainly composed of a metal; an anode supported by the support; and a mixed layer interposed between the support and the anode, wherein the anode includes an electrode bone structure composed of a ceramic material containing a first oxide having electron conductivity and a second oxide having oxygen ion conductivity, and the mixed layer has a structure in which a metallic material and a ceramic material are mixed.

According to a second aspect of the present embodiments, there is provided a manufacturing method of a solid oxide fuel cell, the manufacturing method including: preparing a multilayer structure in which a support green sheet, a mixed layer green sheet, and an anode green sheet are stacked, the support green sheet containing powder of a metallic material, the mixed layer green sheet containing powder of a metallic material and powder of a ceramic material, the anode green sheet containing powder of a ceramic material; and firing the multilayer structure to form a support from the support green sheet, form a mixed layer from the mixed layer green sheet, and form an electrode bone structure composed of the ceramic material from the anode green sheet.

BRIEF DESCRIPTION OF THE DRAWINGS

FIG. 4A presents the manufacturing conditions of examples 1 to 10 and comparative examples 1 and 2, and FIG. 4B presents the results of examples 1 to 10 and comparative examples 1 and 2.

DETAILED DESCRIPTION

Hereinafter, an embodiment will be described with reference to the accompanying drawings.

Figure 1:
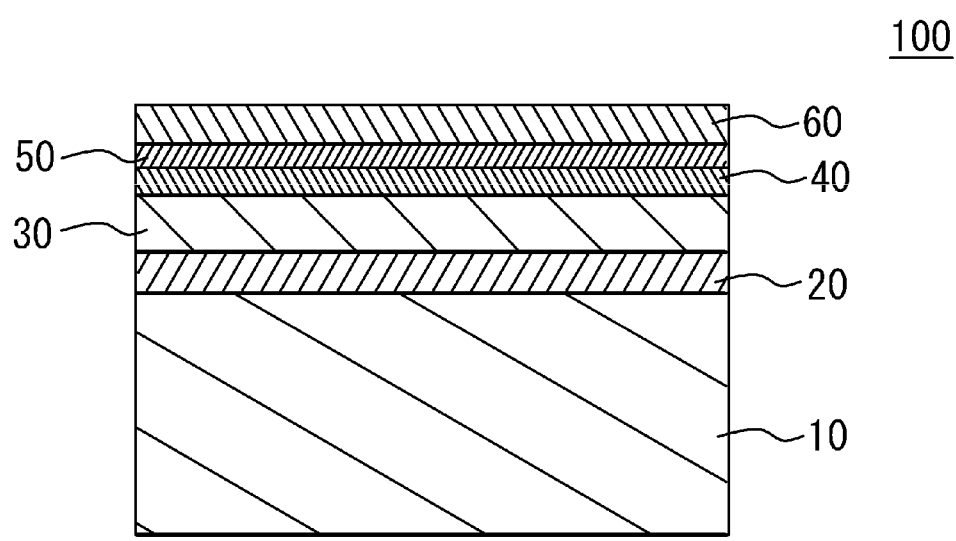
FIG. 1 is a schematic cross-sectional view of a multilayer structure of a fuel cell.

FIG. 1 is a schematic cross-sectional view of a stacking structure of a solid oxide fuel cell 100. As illustrated in FIG. 1, the fuel cell 100 has, as an example, a structure in which a mixed layer 20, an anode 30, an electrolyte layer 40, a reaction prevention layer 50, and a cathode 60 are stacked on a support 10 in this order. A plurality of the fuel cells 100 may be stacked to structure a fuel cell stack.

The electrolyte layer 40 is a dense layer that is mainly composed of solid oxide having oxygen ion conductivity and has gas impermeability. The electrolyte layer 40 is preferably mainly composed of scandia yttria stabilized zirconium oxide (ScYSZ). The oxygen ion conductivity is highest when the concentration of $Y_2O_3+Sc_2O_3$ is 6 mol % to 15 mol %. Thus, use of a material having this composition is preferable. The thickness of the electrolyte layer 40 is preferably 20 µm or less, further preferably 10 µm or less. The thinner electrolyte layer is better. However, to prevent gas at the upper face side and gas at the lower face side from leaking, the thickness is preferably 1 µm or greater.

The cathode 60 is an electrode having electrode activity as a cathode, and has electron conductivity and oxygen ion conductivity. For example, the cathode 60 is lanthanum strontium cobaltite (LCS) having electron conductivity and oxygen ion conductivity. LSC is LaCoO₃ doped with strontium (Sr).

The reaction prevention layer 50 is mainly composed of a component that prevents reaction between the electrolyte layer 40 and the cathode 60. For example, the reaction prevention layer 50 is mainly composed of Gd-doped ceria (GDC) that is CeO₂ doped with gadolinium (Gd). As an example, when the electrolyte layer 40 contains ScYSZ and the cathode 60 contains LSC, the reaction prevention layer 50 prevents the following reactions.

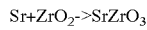

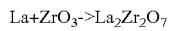

Figure 2:
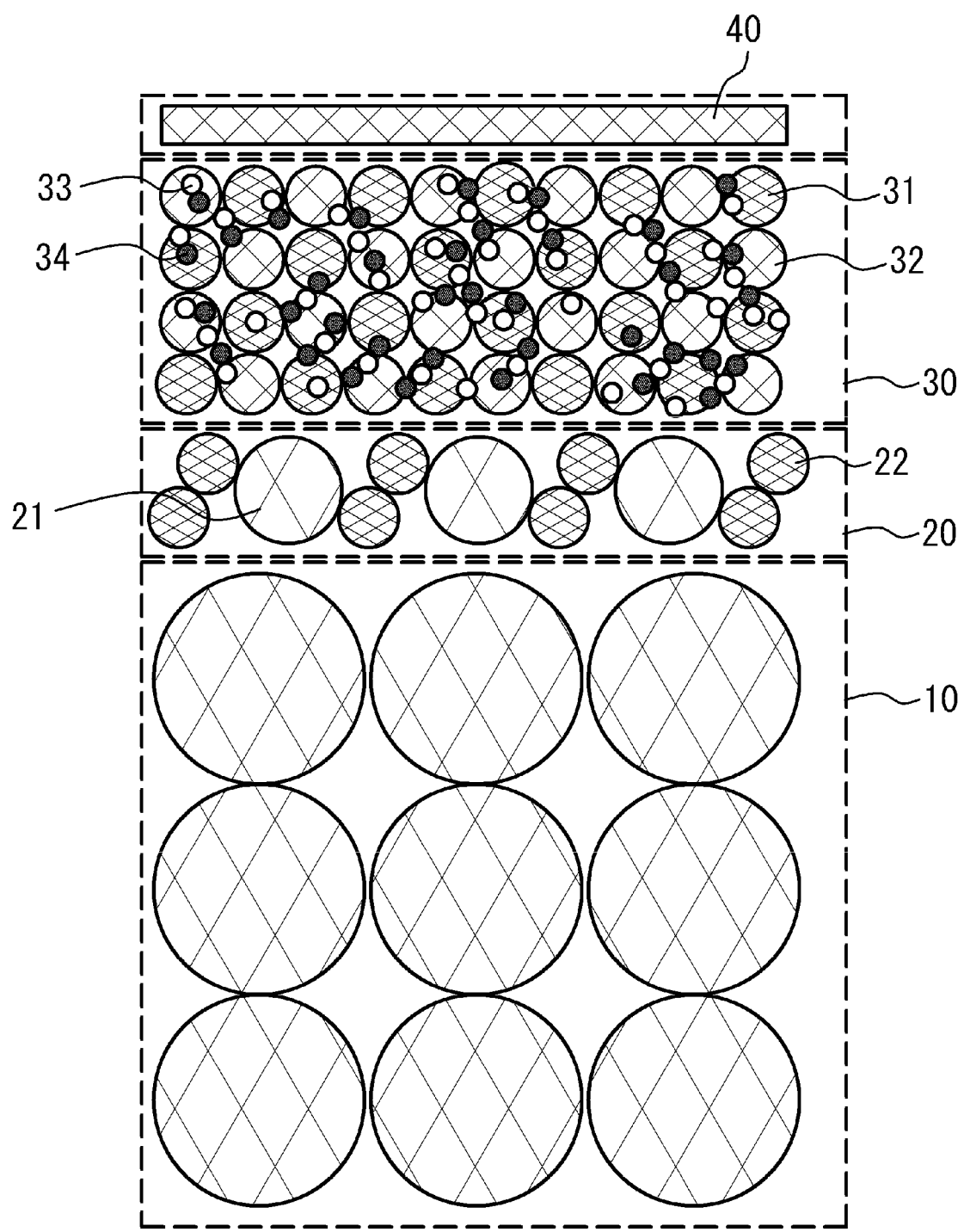
FIG. 2 is an enlarged cross-sectional view of the details of a support, a mixed layer, and an anode.

FIG. 2 is an enlarged cross-sectional view illustrating details of the support 10, the mixed layer 20, and the anode 30. As illustrated in FIG. 2, the support 10 is a member that has gas permeability and is able to support the mixed layer 20, the anode 30, the electrolyte layer 40, the reaction prevention layer 50, and the cathode 60. The support 10 is a porous metallic material, and is, for example, a porous material of Fe—Cr alloys.

The anode 30 is an electrode having electrode activity as an anode, and has an electrode bone structure made of a ceramic material. The electrode bone structure contains no metallic component. In this configuration, decrease in the porosity in the anode due to coarsening of a metallic component is inhibited during firing in a high-temperature reductive atmosphere. Additionally, alloying with a metallic component of the support 10 is inhibited, and deterioration of the catalyst function is inhibited.

The electrode bone structure of the anode 30 preferably has electron conductivity and oxygen ion conductivity. The anode 30 preferably contains a first oxide 31 as an electron conductive material. The first oxide 31 can be a perovskite-type oxide expressed by the composition formula of ABO₃ where the A site is at least one selected from a group consisting of Ca, Sr, Ba, and La, and the B site is at least one selected from Ti and Cr. The mole fraction of the B site may be equal to or greater than the mole fraction of the A site (B≥A). More specifically, the first oxide 31 can be a LaCrO₃-based material or a LaTiO₃-based material.

The electrode bone structure of the anode 30 preferably contains a second oxide 32 as an oxygen ion conductive material. The second oxide 32 is ScYSZ. For example, it is preferable to use ScYSZ having the following composition range. Scandia (Sc₂O₃) is 5 mol % to 16 mol %, and yttria (Y₂O₃) is 1 mol % to 3 mol %. It is more preferable to use ScYSZ of which the total additive amount of scandia and yttria is 6 mol % to 15 mol %. This is because the highest oxygen ion conductivity is obtained in this composition range. The oxygen ion conductive material is, for example, a material with a transference number of oxygen ion of 99% or greater. GDC may be used as the second oxide 32. In the example of FIG. 2, a solid oxide identical to the solid oxide contained in the electrolyte layer 40 is used as the second oxide 32.

As illustrated in FIG. 2, in the anode 30, for example, the first oxide 31 and the second oxide 32 form the electrode bone structure. This electrode bone structure forms a plurality of pores. A catalyst is carried on the surface exposed to the pore of the electrode bone structure. Thus, in the spatially continuously formed electrode bone structure, a plurality of catalysts is spatially dispersed. A composite catalyst is preferably used as the catalyst. For example, a third oxide 33 having oxygen ion conductivity and a catalyst metal 34 are preferably carried, as a composite catalyst, on the surface of the electrode bone structure. The third oxide 33 may be, for example, BaCe₁₋ₓZrₓO₃ doped with Y (BCZY, x=0 to 1), SrCe₁₋ₓZrₓO₃ doped with Y (SCZY, x=0 to 1), LaScO₃ doped with Sr (LSS), or GDC. Ni or the like may be used as the catalyst metal 34. The third oxide 33 may have a composition identical to that of the second oxide 32, or may have a composition different from that of the second oxide 32. A metal acting as the catalyst metal 34 may be in a form of compound when electric power is not generated. For example, Ni may be in a form of a nickel oxide (NiO). These compounds are reduced with a reductive fuel gas supplied to the anode 30, and becomes in a form of metal acting as an anode catalyst.

The mixed layer 20 contains a metallic material 21 and a ceramic material 22. In the mixed layer 20, the metallic material 21 and the ceramic material 22 are randomly mixed. Thus, a structure in which a layer of the metallic material 21 and a layer of the ceramic material 22 are stacked is not formed. Also in the mixed layer 20, a plurality of pores is formed. The metallic material 21 is not particularly limited as long as the metallic material 21 is a metal. In the example of FIG. 2, a metallic material identical to the metallic material of the support 10 is used as the metallic material 21. The first oxide 31 or the second oxide 32 can be used as the ceramic material 22. For example, ScYSZ, GDC, a LaTiO₃-based material, or a LaCrO₃-based material can be used as the ceramic material 22. Since the LaTiO₃-based material and the LaCrO₃-based material have high electron conductivity, the ohmic resistance in the mixed layer 20 can be reduced.

The fuel cell 100 generates power by the following actions. An oxidant gas containing oxygen, such as air, is supplied to the cathode 60. At the cathode 60, oxygen reaching the cathode 60 reacts with electrons supplied from an external electric circuit to become oxygen ions. The oxygen ions conduct through the electrolyte layer 40 to move to the anode 30 side. On the other hand, a fuel gas containing hydrogen, such as a hydrogen gas or a reformed gas, is supplied to the support 10. The fuel gas reaches the anode 30 through the support 10 and the mixed layer 20. Hydrogen reaching the anode 30 release electrons at the anode 30 and reacts with oxygen ions conducting through the electrolyte layer 40 from the cathode 60 side to become water (H₂O). The released electrons are drawn out to the outside by the external electric circuit. The electrons drawn out to the outside are supplied to the cathode 60 after doing electric work. Through the above-described actions, electric power is generated.

In the above-described power generation reaction, the catalyst metal 34 acts as a catalyst in the reaction between hydrogen and oxygen ions. The first oxide 31 conducts electrons obtained by the reaction between hydrogen and oxygen ions. The second oxide 32 conducts oxygen ions reaching the anode 30 from the electrolyte layer 40.

In the fuel cell 100 according to the present embodiment, the support 10 is mainly composed of a metal, and the electrode bone structure of the anode 30 is composed of ceramic. In the aforementioned structure, when firing is performed such that the support 10 and the anode 30 are in contact with each other, the difference in material properties between metal and ceramic may cause interlayer peeling between the support 10 and the anode 30. In particular, ceramic fired in a strong reductive atmosphere has poor adhesiveness with metal. In contrast, the fuel cell 100 according to the present embodiment includes the mixed layer 20 interposed between the support 10 and the anode 30. Since the mixed layer 20 contains the metallic material 21 and the ceramic material 22, the mixed layer 20 has material properties of metal and material properties of ceramic. Thus, the mixed layer 20 has high adhesiveness with the support 10 and high adhesiveness with the anode 30. Therefore, interlayer peeling between the support 10 and the anode 30 can be inhibited.

When the area ratio of the metallic material 21 is excessively small in the mixed layer 20, the adhesion between the support 10 and the mixed layer 20 may be insufficient. Thus, it is preferable to set a lower limit for the area ratio of the metallic material 21 in the mixed layer 20. On the other hand, when the area ratio of the ceramic material 22 is excessively small in the mixed layer 20, the adhesion between the mixed layer 20 and the anode 30 may be insufficient. Thus, it is preferable to set a lower limit for the area ratio of the ceramic material 22 in the mixed layer 20. For example, in the mixed layer 20, the ratio of the area of the metallic material 21 to the area of the ceramic material 22 is preferably 1:9 to 9:1. For example, the area ratio of the metallic material 21 excluding pores in the mixed layer 20 {the area of the metallic material/(the area of the metallic material+the area of the ceramic material)} is preferably 10% or greater, more preferably 25% or greater, further preferably 40% or greater. The area ratio of the ceramic material 22 excluding pores in the mixed layer 20 is preferably 10% or greater, more preferably 25% or greater, further preferably 40% or greater.

When the mixed layer 20 is excessively thin, the adhesion between the support 10 and the anode 30 may be insufficient. Thus, it is preferable to set a lower limit for the thickness of the mixed layer 20. For example, the mixed layer 20 preferably has a thickness of 1 μm or greater, more preferably 3 μm or greater, further preferably 4 μm or greater.

Additionally, in the fuel cell 100 according to the present embodiment, the third oxide 33 is carried on the electrode bone structure of the anode 30. This structure allows to first form the electrode bone structure by firing, and then, impregnate the electrode bone structure with the third oxide 33 and fire the electrode bone structure at low temperature. Thus, even when the second oxide 32 and the third oxide 33 do not have the same composition, reaction between oxides is inhibited. Therefore, the degree of freedom to select, as the third oxide 33, an oxide appropriate to the composite catalyst is increased.

Additionally, the porosity in the support 10, the porosity in the mixed layer 20, and the porosity in the anode 30 preferably have a relationship of the porosity in the support 10>the porosity in the mixed layer 20>the porosity in the anode 30. This relationship allows the support 10 to have sufficient gas permeability. Since the anode 30 has a comparatively low porosity, the anode 30 obtains high electron conductivity and high oxygen ion conductivity while maintaining gas permeability. The mixed layer 20 obtains gas permeability and the contact area with the support 10 is obtained. Thus, the mixed layer 20 obtains the adhesion with the support 10. The porosity is calculated from the ratio of the estimated area of the pores to the entire area based on an SEM image of the cross-section of a sample.

Figure 3:
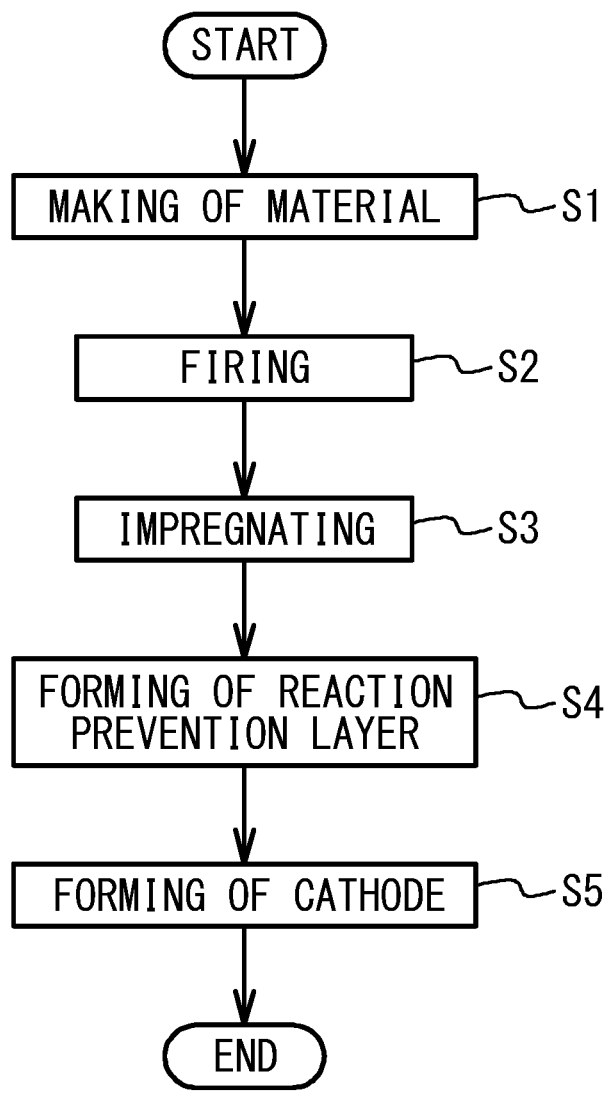
FIG. 3 is a flowchart of a manufacturing method of the fuel cell.

Hereinafter, a manufacturing method of the fuel cell 100 will be described. FIG. 3 is a flowchart of the manufacturing method of the fuel cell 100.

Making Process of Material for Support

Metallic powder having a particle size of, for example, 10 μm to 100 μm, a plasticizer, a solvent, a vanishing material, and a binder are mixed to make slurry as a material for support. The amount of the plasticizer is adjusted to, for example, 1 wt % to 6 wt % to adjust the adhesiveness of the sheet. The solvent is toluene, 2-propanol (IPA), 1-butanol, terpineol, butyl acetate, ethanol, or the like. The amount of the solvent is 20 wt % to 30 wt % depending on the viscosity or the like. The vanishing material is an organic substance. The binder is PVB, acrylic resin, ethyl cellulose, or the like. The material for support is used as a material for forming the support 10. The ratio of the volume of the organic components (the vanishing material, the solid component of the binder, and the plasticizer) to the volume of the metallic powder is within a range of, for example, 1:1 to 20:1. The amount of the organic components is adjusted depending on the porosity.

Making Process of Material for Mixed Layer

Ceramic material powder, which is the raw material of the ceramic material 22, metallic material powder having a small particle size, which is the raw material of the metallic material 21, a solvent, a plasticizer, and a binder are mixed to make slurry as a material for mixed layer. The ceramic material powder has a particle size of, for example, 100 nm to 10 μm. The metallic material powder has a particle size of, for example, 1 μm to 10 μm. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The vanishing material is an organic substance. The binder is PVB, acrylic resin, ethyl cellulose, or the like. The ratio of the volume of the organic components (the vanishing material, the solid component of the binder, and the plasticizer) to the volume of the ceramic material powder and the metallic material powder is within a range of, for example, 1:1 to 5:1. The amount of the organic components is adjusted depending on the porosity. The diameter of the pore is controlled by adjusting the particle size of the vanishing material. The ceramic material powder may contain powder of an electron conductive material and powder of an oxide-ion conductive material. In this case, the ratio of the volume of the powder of the electron conductive material to the volume of the powder of the oxide-ion conductive material is preferably within a range of, for example, 1:9 to 9:1. Use of an electrolyte material such as ScYSZ, GDC, or the like instead of the electron conductive material also prevents the peeling of the boundary face and enables the manufacture of the cell. However, to reduce the ohmic resistance, it is preferable to mix an electron conductive material and metallic powder.

Making Process of Material for Anode

Ceramic material powder structuring the electrode bone structure, a solvent, a plasticizer, a vanishing material, and a binder are mixed to make slurry as a material for anode. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to, for example, 1 wt % to 6 wt % to adjust the adhesiveness of the sheet. The vanishing material is an organic substance. The binder is PVB, acrylic resin, ethyl cellulose, or the like. Powder of the electron conductive material that is the raw material of the first oxide 31 and has a particle size of, for example, 100 nm to 10 μm and powder of the oxygen ion conductive material that is the raw material of the second oxide 32 and has a particle size of, for example, 100 nm to 10 μm may be used as the ceramic material powder structuring the electrode bone structure. The ratio of the volume of the organic components (the vanishing material, the solid component of the binder, and the plasticizer) to the volume of the powder of the electron conductive material is within a range of, for example, 1:1 to 5:1, and the amount of the organic components is adjusted depending on the porosity. Additionally, the diameter of the pore is controlled by adjusting the particle size of the vanishing material. The ratio of the volume of the powder of the electron conductive material to the volume of the powder of the oxygen ion conductive material is within a range of, for example, 3:7 to 7:3.

Making Process of Material for Electrolyte Layer

Powder of an oxygen-ion conductive material, a solvent, a plasticizer, and a binder are mixed to make slurry as a material for electrolyte layer. The powder of the oxygen-ion conductive material is, for example, ScYSZ, YSZ, GDC, or the like, and has a particle size of 10 nm to 1000 nm. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The binder is PVB, acrylic resin, ethyl cellulose, or the like. The ratio of the volume of the organic components (the solid component of the binder and the plasticizer) to the volume of the powder of the oxygen ion conductive material is within a range of, for example, 6:4 to 3:4.

Making Process of Material for Cathode

Powder of lanthanum strontium cobaltite (LSC: LaSr-CoO$_3$), a solvent, a plasticizer, and a binder are mixed to make slurry as a material for cathode. The solvent is toluene, 2-propanol (IPA), 1-butanol, terpineol, butyl acetate, ethanol, or the like, and the amount of the solvent is 20 wt % to 30 wt % depending on the viscosity. The plasticizer is adjusted to 1 wt % to 6 wt % to adjust the adhesiveness of the sheet. The binder is PVB, acrylic resin, ethyl cellulose, or the like. The ratio of the volume of the organic components (the solid component of the binder, the plasticizer) to the volume of LSC powder is within a range of, for example, 6:4 to 1:4.

Firing Process

A support green sheet is made by applying the material for support on a polyethylene terephthalate (PET) film. A mixed layer green sheet is made by applying the material for mixed layer on another PET film. An anode green sheet is made by applying the material for anode on yet another PET film. An electrolyte layer green sheet is made by applying the material for electrolyte layer on yet another PET film. For example, several support green sheets, one mixed layer green sheet, one anode green sheet, and one electrolyte layer green sheet are stacked in this order, cut into a predetermined size, and fired within a temperature range of approximately 1100° C. to 1300° C. in a reductive atmosphere with an oxygen partial pressure of $10^{-20}$ atm or less. Through the above process, a half cell including the support 10, the mixed layer 20, the electrode bone structure of the anode 30, and the electrolyte layer 40 is obtained.

Impregnating Process

Next, the electrode bone structure of the anode 30 is impregnated with the raw materials of the third oxide 33 and the catalyst metal 34. For example, the following process is repeated as many times as needed such that Gd-doped ceria or Sc, Y-doped zirconia and Ni are generated when the cell is fired in a reductive atmosphere at a predetermined temperature. Nitrate or chloride of Zr, Y, Sc, Ce, Gd, or Ni is dissolved in water or alcohol (ethanol, 2-propanol, methanol or the like). A half cell is impregnated with the resulting solution, and dried. The resulting half cell is subjected to heat treatment.

Forming Process of Reaction Preventing Layer

As the reaction prevention layer 50, $Ce_{0.8}Gd_{0.2}O_{2-x}$ is formed so as to have a thickness of 1 μm by, for example, PVD.

Forming Process of Cathode

Next, the material for cathode is applied on the reaction prevention layer 50 by screen printing and is then dried. Then, a cathode is sintered by heat treatment. Through the above process, the fuel cell 100 can be fabricated.

In the manufacturing method according to the present embodiment, since the material for mixed layer contains a metallic material and a ceramic material, the mixed layer 20 after firing contains the metallic material 21 and the ceramic material 22. Thus, the mixed layer 20 has material properties of metal and material properties of ceramic. Therefore, interlayer peeling between the support 10 and the anode 30 is inhibited.

Additionally, the amount of the vanishing material in the material for support, the amount of the vanishing material in the material for mixed layer, the amount of the vanishing material in the material for anode are preferably adjusted such that the porosity in the support 10, the porosity in the mixed layer 20, and the porosity in the anode 30 have a relationship of the porosity in the support 10>the porosity in the mixed layer 20>the porosity in the anode 30. This relationship allows the support 10 to have sufficient gas permeability. The anode 30 becomes dense, and obtains high oxygen ion conductivity. The mixed layer 20 obtains gas permeability, and also obtains the contact area with the support 10, thereby obtaining adhesion with the support 10.

In the manufacturing method according to the present embodiment, the electrode bone structure is first formed by firing. Then, the electrode bone structure is impregnated with the composite catalyst and fired at low temperature (for example, 850° C. or less). Thus, even when the second oxide 32 and the third oxide 33 do not have the same composition, the reaction between oxides is inhibited. Therefore, the degree of freedom to select, as the third oxide 33, an oxide appropriate to the composite catalyst is increased.

EXAMPLES

The fuel cell 100 was fabricated according to the manufacturing method in accordance with the above embodiment.

Example 1

ScYSZ was used as the electrolyte layer 40. A LaTiO$_3$-based material was used for the first oxide 31 of the anode 30, and ScYSZ was used for the second oxide 32. ScYSZ was used for the third oxide 33, and Ni was used for the catalyst metal 34. The electrode bone structure was formed of the first oxide 31 and the second oxide 32. A LaTiO$_3$-based material was used for the ceramic material 22 of the mixed layer 20. Stainless steel (SUS) was used for the metallic material 21 of the mixed layer 20. The ratio of the area of the ceramic material 22, the area of the metallic material 21, and the area of pores in the mixed layer 20 estimated from an SEM image of the cross-section of the sample was 1:1:1. The cell after stacking was fired under a reductive atmosphere with an oxygen partial pressure of $10^{-20}$ atm or less. Additionally, the resulting cell was impregnated with the composite catalyst, and was then fired under an air atmosphere at a temperature of 850° C. or less.

Example 2

ScYSZ was used as the electrolyte layer 40. A LaCrO$_3$-based material was used for the first oxide 31 of the anode 30, and SYSZ was used for the second oxide 32. ScYSZ was used for the third oxide 33, and Ni was used for the catalyst metal 34. The electrode bone structure was formed of the first oxide 31 and the second oxide 32. A LaCrO$_3$-based material was used for the ceramic material 22 of the mixed layer 20. SUS was used for the metallic material 21 of the mixed layer 20. The ratio of the area of the ceramic material 22, the area of the metallic material 21, and the area of pores in the mixed layer 20 estimated from an SEM image of the cross-section of the sample was 1:1:1. The cell after stacking was fired under a reductive atmosphere with an oxygen partial pressure of $10^{-20}$ atm or less. Additionally, the resulting cell was impregnated with the composite catalyst, and was then fired under air atmosphere at a temperature of 850° C. or less.

Example 3

ScYSZ was used for the electrolyte layer 40. A LaCrO$_3$-based material was used for the first oxide 31 of the anode 30, and ScYSZ was used for the second oxide 32. GDC was used for the third oxide 33, and Ni was used for the catalyst metal 34. The electrode bone structure was formed of the first oxide 31 and the second oxide 32. A LaCrO$_3$-based material was used for the ceramic material 22 of the mixed layer 20. SUS was used for the metallic material 21 of the mixed layer 20. The ratio of the area of the ceramic material 22, the area of the metallic material 21, and the area of pores in the mixed layer 20 estimated from an SEM image of the cross-section of the sample was 1:1:1. The cell after stacking was fired in a reductive atmosphere with an oxygen partial pressure of $10^{-20}$ atm or less. The resulting cell was impregnated with the composite catalyst, and was then fired under an air atmosphere at a temperature of 850° C. or less.

Example 4

GDC was used for the electrolyte layer 40. A LaCrO$_3$-based material was used for the first oxide 31 of the anode 30, and GDC was used for the second oxide 32. ScYSZ was used for the third oxide 33, and Ni was used for the catalyst metal 34. The electrode bone structure was formed of the first oxide 31 and the second oxide 32. A LaCrO$_3$-based material was used for the ceramic material 22 of the mixed layer 20. SUS was used for the metallic material 21 of the mixed layer 20. The ratio of the area of the ceramic material 22, the area of the metallic material 21, and the area of pores in the mixed layer 20 estimated from an SEM image of the cross-section of the sample was 1:1:1. The cell after stacking was fired in a reductive atmosphere with an oxygen partial pressure of $10^{-20}$ atm or less. Additionally, the resulting cell was impregnated with the composite catalyst, and was then fired under an air atmosphere at a temperature of 850° C. or less.

Example 5

ScYSZ was used as the electrolyte layer 40. A LaCrO$_3$-based material was used for the first oxide 31 of the anode 30, and ScYSZ was used for the second oxide 32. The third oxide 33 was not used, and Ni was used for the catalyst metal 34. The electrode bone structure was formed of the first oxide 31 and the second oxide 32. A LaCrO$_3$-based material was used for the ceramic material 22 of the mixed layer 20. SUS was used for the metallic material 21 of the mixed layer 20. The ratio of the area of the ceramic material 22, the area of the metallic material 21, and the area of pores in the mixed layer 20 estimated from an SEM image of the cross-section of the sample was 1:1:1. The cell after stacking was fired in a reductive atmosphere with an oxygen partial pressure of $10^{-20}$ atm or less. In addition, the resulting cell was impregnated with the composite catalyst, and was then fired under an air atmosphere at a temperature of 850° C. or less.

Example 6

ScYSZ was used as the electrolyte layer 40. A LaCrO$_3$-based material was used for the first oxide 31 of the anode 30, and ScYSZ was used for the second oxide 32. GDC was used for the third oxide 33, and Ni was used for the catalyst metal 34. The electrode bone structure was formed of the first oxide 31 and the second oxide 32. ScYSZ was used for the ceramic material 22 of the mixed layer 20. SUS was used for the metallic material 21 of the mixed layer 20. The ratio of the area of the ceramic material 22, the area of the metallic material 21, and the area of pores in the mixed layer 20 estimated from an SEM image of the cross-section of the sample was 1:1:1. The cell after stacking was fired in a reductive atmosphere with an oxygen partial pressure of $10^{-20}$ atm or less. Additionally, the resulting cell was impregnated with the composite catalyst, and was then fired under an air atmosphere at a temperature of 850° C. or less.

Example 7

ScYSZ was used as the electrolyte layer 40. A LaTiO$_3$-based material was used for the first oxide 31 of the anode 30, and ScYSZ was used for the second oxide 32. ScYSZ was used for the third oxide 33, and Ni was used for the catalyst metal 34. The electrode bone structure was formed of the first oxide 31 and the second oxide 32. A LaTiO$_3$-based material was used for the ceramic material 22 of the mixed layer 20. SUS was used for the metallic material 21 of the mixed layer 20. The ratio of the area of the ceramic material 22, the area of the metallic material 21, and the area of pores in the mixed layer 20 estimated from an SEM image of the cross-section of the sample was 1:6:3. The cell after stacking was fired in a reductive atmosphere with an oxygen partial pressure of $10^{-20}$ atm or less. The resulting cell was impregnated with the composite catalyst, and was then fired under an air atmosphere at a temperature of 850° C. or less.

Example 8

ScYSZ was used as the electrolyte layer 40. A LaTiO$_3$-based material was used for the first oxide 31 of the anode 30, and ScYSZ was used for the second oxide 32. ScYSZ was used for the third oxide 33, and Ni was used for the catalyst metal 34. The electrode bone structure was formed of the first oxide 31 and the second oxide 32. A LaTiO$_3$-based material was used for the ceramic material 22 of the mixed layer 20. SUS was used for the metallic material 21 of the mixed layer 20. The ratio of the area of the ceramic material 22, the area of the metallic material 21, and the area of pores in the mixed layer 20 estimated from an SEM image of the cross-section of the sample was 6:1:3. The cell after stacking was fired in a reductive atmosphere with an oxygen partial pressure of $10^{-20}$ atm or less. Additionally, the resulting cell was impregnated with the composite catalyst, and was then fired under an air atmosphere at a temperature of 850° C. or less.

Example 9

ScYSZ was used as the electrolyte layer 40. A LaTiO$_3$-based material was used for the first oxide 31 of the anode 30, and ScYSZ was used for the second oxide 32. ScYSZ was used for the third oxide 33, and Ni was used for the catalyst metal 34. The electrode bone structure was formed of the first oxide 31 and the second oxide 32. A LaTiO$_3$-based material was used for the ceramic material 22 of the mixed layer 20. SUS was used for the metallic material 21 of the mixed layer 20. The ratio of the area of the ceramic material 22, the area of the metallic material 21, and the area of pores in the mixed layer 20 estimated from an SEM image of the cross-section of the sample was 4.5:4.5:1. The cell after stacking was fired in a reductive atmosphere with an oxygen partial pressure of $10^{-20}$ atm or less. Additionally, the resulting cell was impregnated with the composite catalyst, and was then fired under an air atmosphere at a temperature of 850° C. or less.

Comparative Example 1

No mixed layer 20 was provided. Other conditions were the same as those of example 2. The cell after stacking was fired under a reductive atmosphere with an oxygen partial pressure of $10^{-20}$ atm or less.

Comparative Example 2

In the anode 30, the electrode bone structure was formed of Ni and ScYSZ. No mixed layer 20 was provided. Additionally, neither the third oxide 33 nor the catalyst metal 34 was provided. Other conditions were the same as those of example 1. The cell after stacking was fired in a reductive atmosphere with an oxygen partial pressure of $10^{-20}$ atm or less.

The manufacturing conditions of examples 1 to 9 and comparative examples 1 and 2 were presented in FIG. 4A.

Interlayer Peeling

In examples 1 to 9 and comparative examples 1 and 2, presence or absence of interlayer peeling was checked. In all examples 1 to 9, interlayer peeling was not observed. This is considered because the mixed layer 20 had a structure in which the metallic material 21 and the ceramic material 22 were mixed. On the other hand, in comparative example 1, interlayer peeling was observed. This is considered because no mixed layer 20 was provided. In comparative example 2, interlayer peeling was not observed. This is considered because Ni, which is a metal, was used for the electrode bone structure of the anode, and the anode thereby acted as the mixed layer.

Evaluation of Power Generation Performance

Impedance of each of the fuel cells of examples 1 to 9 and comparative examples 1 and 2 was measured to separate the resistance value to measure the ohmic resistance of the fuel cell as a whole and the reaction resistance of the anode 30. In comparative example 2, the ohmic resistance was 0.63 Ω·cm$^2$, and the reaction resistance of the anode was 0.97 Ω·cm$^2$. The observation of the cross-section of the cell revealed that Ni grew to large particles of several micrometers due to sintering because the cell was fired in a high-temperature reductive atmosphere. In addition, it is considered that the part that were in contact with the metallic powder of the support and Ni was alloyed, and the catalytic ability was decreased. This is considered the reason why both the ohmic resistance and the reaction resistance were considerably increased. Thus, in comparative example 2, interlayer peeling was not observed, but the power generation performance greatly decreased. In comparative example 1, since interlayer peeling occurred, it was not possible to evaluate the power generation performance.

In example 1, the ohmic resistance was 0.25 Ω·cm$^2$, and the reaction resistance in the anode 30 was 0.27 Ω·cm$^2$. In example 2, the ohmic resistance was 0.25 Ω·cm$^2$, and the reaction resistance in the anode 30 was 0.28 Ω·cm$^2$. In example 3, the ohmic resistance was 0.24 Ω·cm$^2$, and the reaction resistance in the anode 30 was 0.27 Ω·cm$^2$. In example 4, the ohmic resistance was 0.2 Ω·cm$^2$, and the reaction resistance in the anode 30 was 0.21 Ω·cm$^2$. In example 5, the ohmic resistance was 0.5 Ω·cm$^2$, and the reaction resistance in the anode 30 was 1.1 Ω·cm$^2$. In example 6, the ohmic resistance was 0.31 Ω·cm$^2$, and the reaction resistance in the anode 30 was 0.28 Ω·cm$^2$. In example 7, the ohmic resistance was 0.25 Ω·cm$^2$, and the reaction resistance in the anode 30 was 0.27 Ω·cm$^2$. In example 8, the ohmic resistance was 0.25 Ω·cm$^2$, and the reaction resistance in the anode 30 was 0.27 Ω·cm$^2$. In example 9, the ohmic resistance was 0.25 Ω·cm$^2$, and the reaction resistance in the anode 30 was 0.82 Ω·cm$^2$.

The results of examples 1 to 9 reveal that the ohmic resistance was made to be good by making the electrode bone structure of the anode 30 include the first oxide 31 having electron conductivity. The results of examples 2 to 6 reveal that LaCrO$_3$ was not decomposed into CrO$_3$ as a result of firing in a reductive atmosphere and the anode 30 equivalent to the anode made of a LaTiO$_3$-based material was fabricated. The results of examples 1 to 4 and 6 to 9 reveal that the anode reaction resistance was made to be good by making the composite catalyst include the third oxide 33 having oxygen ion conductivity.

From the result of example 3, it is considered that even when ScYSZ was used for the electrode bone structure of the anode 30, the reaction between ScYSZ and GDC was inhibited because the temperature in the firing after impregnation was set at low temperature.

Both the ohmic resistance and the anode reaction resistance of example 4 were lowest. High ionic conductivity of GDC and decrease in the electrode reaction resistance due to the electron conductivity in the reductive atmosphere were considered the reason for this.

Additionally, comparison between example 3 and example 6 reveals that the ohmic resistance is further reduced by using ceramic with electron conductivity for the mixed layer 20.

The result of example 9 reveals that the anode reaction resistance becomes small when the area ratio of pores in the mixed layer 20 is greater than 10%.

Although the embodiments of the present invention have been described in detail, the present invention is not limited to such a specific embodiment, and it is to be understood that the various change, substitutions, and alterations could be made hereto without departing from the spirit and scope of the invention.

What is claimed is:

1. A solid oxide fuel cell comprising:
   a support layer mainly composed of a metal;
   an anode supported by the support; and
   a mixed layer interposed between the support and the anode, wherein
   the anode includes an electrode bone structure composed of a ceramic material containing a first oxide having electron conductivity and a second oxide having oxygen ion conductivity, and
   the mixed layer has a structure in which a metallic material and a ceramic material are mixed,
   wherein the first oxide is $LaTiO_3$, and
   wherein the ceramic material of the mixed layer is $LaTiO_3$.

2. The solid oxide fuel cell according to claim 1, wherein the ceramic material of the mixed layer has electron conductivity.

3. The solid oxide fuel cell according to claim 1, wherein a porosity is 10% or greater in the mixed layer.

4. The solid oxide fuel cell according to claim 1, wherein in the mixed layer, a ratio of an area of the metallic material to an area of the ceramic material is 1:9 to 9:1.

5. The solid oxide fuel cell according to claim 1, wherein the mixed layer has a thickness of 1 µm or greater.

6. The solid oxide fuel cell according to claim 1, wherein a porosity in the support, a porosity in the mixed layer, and a porosity in the anode have a relationship of the porosity in the support>the porosity in the mixed layer>the porosity in the anode.

7. The solid oxide fuel cell according to claim 1, wherein the anode includes a catalyst carried on the electrode bone structure.

8. The solid oxide fuel cell according to claim 7, wherein the catalyst includes a catalyst metal and a third oxide having oxygen ion conductivity.

9. The solid oxide fuel cell according to claim 1, wherein the metallic material of the mixed layer is the same as the metal of the support layer.

10. The solid oxide fuel cell according to claim 1, wherein the metallic material of the mixed layer is stainless steel.

11. The solid oxide fuel cell according to claim 1, wherein the metallic material and $LaTiO_3$ are randomly mixed in the mixed layer.

12. The solid oxide fuel cell according to claim 1, wherein the support layer consists of metal.

* * * * *